July 28, 1970

L. R. PTAK 3,522,126

METHOD FOR BONDING A POLYETHYLENE LINER
TO A CONTAINER CLOSURE
Filed Nov. 17, 1967

INVENTOR
LOUIS R. PTAK

BY Paul Shapiro
ATT'Y.

United States Patent Office 3,522,126
Patented July 28, 1970 }

3,522,126
METHOD FOR BONDING A POLYETHYLENE LINER TO A CONTAINER CLOSURE
Louis R. Ptak, Western Springs, Ill., assignor to Continental Can Company, Inc., New York, N.Y., a corporation of New York
Filed Nov. 17, 1967, Ser. No. 683,986
Int. Cl. C09j 5/02
U.S. Cl. 156—334   8 Claims

ABSTRACT OF THE DISCLOSURE

A container closure is constructed of a metal shell having a primer coating of a mixture of a vinyl chloride copolymer, a thermosetting phenol-aldehyde resin, and an epoxy resin on the interior surface thereof and a polyethylene liner disposed therein and bonded to the primer coated interior surface by an adhesion promoting coating comprised of a blend of polyethylene and polyvinylbutyral.

BACKGROUND OF THE INVENTION

Field of invention

This invention relates to plastic lined container closures and more particularly to metal closure seals wherein the sealing liner is formed from polyethylene.

The prior art

Container closures such as crown caps for sealing containers are customarily made by punching discs from a sheet of tin-plated steel and forming these discs into metal crown shells. Discs of cork composition which are to form the sealing liner for the closure are positioned within the metal crown shells with an adhesive interposed between liner and shell. Heat and pressure are applied to join the liner to the shell.

One disadvantage with cork liners is that due to the porosity of the liner, upon prolonged exposure to such food products as carbonated beverages, the liquid contents of the container permeate the liner and corrode the metal surface of the shell, resulting in unsightly staining or blackening of the cork liner, as well as contamination of the food product with the metal corrosion products of the closure.

To overcome the disadvantages of the cork liner, the art has developed liners molded from synthetic thermoplastic resins, such as polyethylene. An example of a polyethylene liner is disclosed in U.S. 2,238,681. Polyethylene is an excellent closure liner material as it is an inert, non-porous material characterized by resistance to acids and alkalies such as are encountered in pasteurization and closure manufacture, and is relatively tasteless and odorless and is not effected by moisture. However, due to its inert properties, the liner has the disadvantage of exhibiting poor adhesion to the inner surface of the metal, resulting in improper sealing of the containers.

SUMMARY OF THE INVENTION

The difficulties encountered with polyethylene liners are overcome with the present invention which provides an improved metal container closure having a polyethylene liner in which the liner is securely bonded to the metal and will provide an effective seal for the sealing of containers under the sealing pressures encountered in the packaging of food products.

Briefly, the present invention consists in providing a closure for sealing containers comprising a metal shell having an interior surface coated with a primer coating comprised of a mixture of a vinyl chloride copolymer, a thermosetting phenol-aldehyde resin, and an epoxy resin, a polyethylene liner disposed therein and adhered to the coated inner surface of the shell by an adhesion-promoting composition comprising a mixture of polyethylene and polyvinylbutyral.

Figure 1:
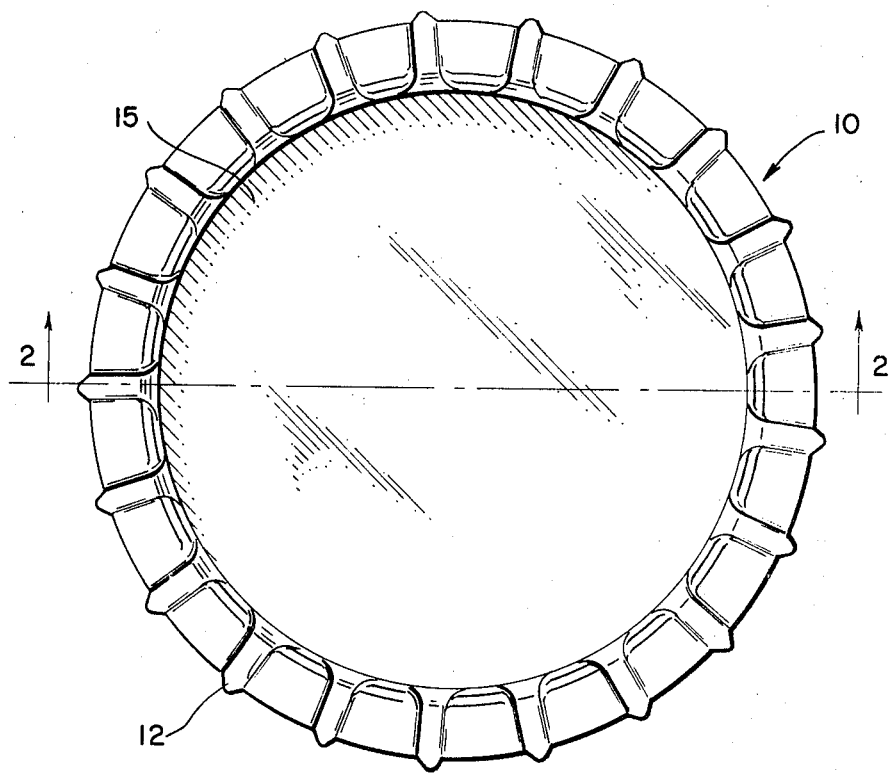
Figure 2:
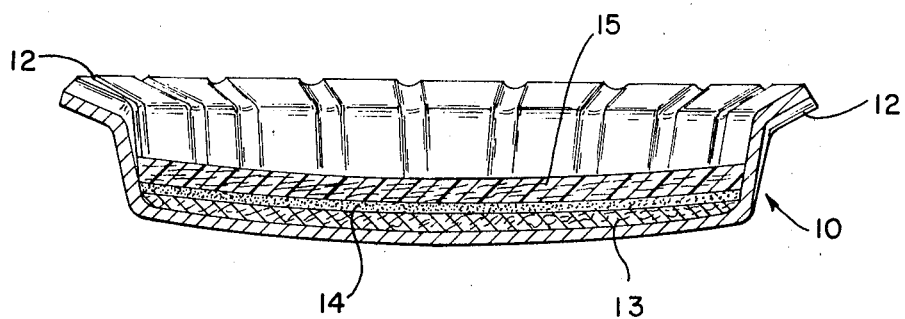

In the drawing:
FIG. 1 is a plan view of the interior of the crown closure constructed in accordance with the present invention;
FIG. 2 is a cross-sectional view taken along line 2—2 of FIG. 1.

In the drawing, a container closure of the crown type has been shown for the purpose of illustration, it being, however, obvious that the invention may be applied to any and all sealing closures, the forms of the metal closures being immaterial as far as the invention is concerned, as will readily appear from the following description.

Referring now more particularly to the drawings, there is shown a crown shell having a body 10 and a corrugated skirt 12 which is adapted to be locked in the well-known manner to the exterior of a bottle neck. The interior surface of the crown body 10 is coated with an inner anchor or primer coating 13 of a mixture of a vinyl chloride copolymer, a thermosetting phenol-aldehyde resin and an epoxy resin. Disposed within the crown body 10 is a polyethylene sealing liner 15 which is firmly bonded to the primer coated shell with an adhesion-promoting coating 14 of a blend of polyethylene and polyvinylbutyral which is interposed between the primer coated metal surface and the liner.

PREFERRED EMBODIMENTS

In preparing the crown closures of the present invention, a primer coating comprised of a vinyl chloride copolymer, a thermosetting synthetic resin of the phenol-aldehyde type, and an epoxy resin is applied to one face of the metal stock sheet from which the crown shell is formed. The primer coating contains about 65 to about 85 parts by weight of the vinyl chloride copolymer resin, about 15 to about 25 parts by weight of the thermosetting phenol-aldehyde resin, and about 1 to about 3 parts by weight of the epoxy resin. The primer coating is applied as a liquid solution to the metal surface at a rate of such that the dried film weight ranges from 3.0 to 5.0 milligrams per square inch of metal surface area. The primer coating is hardened by passing the coated shell through a drying oven at about 350° to 375° for about 8 to 10 minutes to evaporate the solvent and cure the primer composition.

The vinyl chloride copolymers useful in the practice of the present invention include vinyl chloride/vinyl acetate/maleic anhydride copolymers and vinyl chloride/vinyl acetate/vinyl alcohol copolymers.

The vinyl chloride copolymer resins are available commercially. Illustrative examples of the commercially available resins include Bakelite VMCH, a product of Union Carbide Plastics Company, composed of about 86% by weight vinyl chloride, about 13% by weight vinyl acetate, and about 1% by weight maleic anhydride; Bakelite VMCC, a product of Union Carbide Plastics Company, composed of about 83% by weight vinyl chloride, about 16% by weight vinyl acetate, and about 1% maleic acid; Bakelite VAGH, a product of the Union Carbide Plastics Company, containing about 91% by weight vinyl chloride, about 3% by weight vinyl acetate, and about 6% by weight vinyl alcohol.

By the term "thermosetting resin of the phenol-aldehyde type" is intended not only those thermosetting resins obtained by the condensation of a phenol with an aldehyde, but also those resins of similar or identical structure obtainable by other reactions, e.g., by the condensation of a phenol with hexamethylene tetramine.

The phenol-aldehyde resin employed in the practice of the present invention is preferably a thermosetting phenol-formaldehyde resin. While the direct condensation products of phenol and formaldehyde are preferred, the term is understood to include the condensation products of formaldehyde with various phenols well known for use in resin formation, e.g., diphenol propane, cresols, resorcinol and other monohydric and polyhydric phenols. Thermosetting resins derived from aldehydes other than formaldehyde may also be used, e.g., the phenol-furfural resins.

Phenol-aldehyde resins are commercially available. An example of a preferred commercially available phenol-aldehyde resin is Varcum 1410, a product of the Reichold Chemical Company. Varcum 1410 is the condensation product of cresylic acid and formaldehyde having a specific gravity of 1.198–1.200, a softening range of 70° to 78° C., and an acid number of 4.0 to 4.4.

Epoxy resins which may be employed in the present invention are those which are produced by the reaction of one or more moles of epichlorhydrin or glycerol dichlorhydrin with a mole of p,p'-dihydroxy-diphenyl-dimethyl methane (Bisphenol A) in the presence of a base, such as sodium hydroxide, and at elevated temperatures within the approximate range of 50° to 150° C. The resinous glycidyl polyether obtained from epichlorhydrin and Bisphenol A is a complex mixture rather than a single chemical compound, which has been represented by the following general formula:

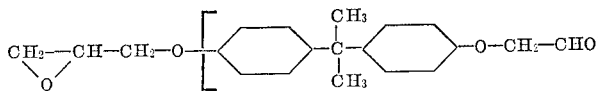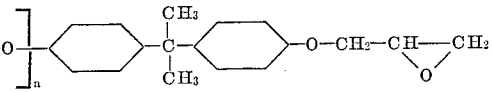

where $n$ has an average value between zero and about seven, depending for the most part on the relative proportions of bisphenol A and epichlorhydrin in the initial reaction mixture.

A number of these epoxy resins are commercially available, such as the Epon resins of the Shell Chemical Corporation, and the Bakelite resins of the Union Carbide Corporation. These resins vary from the liquid state at ordinary room temperatures, for which $n$ in the above formula approaches 0, to high molecular weight solids having melting points well above 100° C.

For example, Bakelite ERL–2774 has an epoxy equivalent of 185–200, and Epon 1004 has an epoxy equivalent of 870–1025.

Other polyhydric phenols, e.g., resorcinol or 2,2-bis-(4-hydroxy-phenyl) butane, as well as various trisphenols, may be substituted for the bisphenol A.

Other polyhydroxy compounds such as glycol or glycerol may be reacted with epichlorhydrin in the presence of boron trifluoride catalyst and the product converted with certain alkaline reagents to the liquid or resinous glycidyl polyether.

The adhesion promoting coating of the polyvinylbutyral/polyethylene blend composition is applied to the metal sheet preprimed with the cured vinylchloride copolymer phenol-aldehyde/epoxy resin coating. The blending of the polyethylene and polyvinylbutyral to form the adhesion-promoting coating of the present invention may be conveniently effected by the use of a common solvent in which both the polyethylene and the polyvinylbutyral are dissolved. The solution of the resins may then be used in coating the prime coated metal shell.

In applying the polyethylene/polyvinylbutyral blend composition, there may be employed a solution containing between about 2% and 6% by weight of polyethylene and between about 9% and 13% by weight polyvinylbutyral dissolved in a suitable solvent, such as aliphatic alcohols, ethanol, methanol, isopropanol, methanol, aromatic hydrocarbons, such as xylene, toluene, ketones such as dioxane, acetone, 2-butanone, methyl ethyl ketone, isophorone and mixtures thereof. The ratio of polyethylene to polyvinylbutyral in the coating composition is preferably 2:1.

The polyvinylbutyral is prepared from the condensation of polyvinyl alcohol with butyraldehyde. The polyvinylbutyral useful in the present invention has a butyral content of between about 77% and about 85% by weight calculated as polyvinylbutyral, and a content of free hydroxy groups of between about 13% and about 21% by weight calculated as polyvinylalcohol.

The polyethylene is preferably a high density polyethylene having a density between 0.95 and 0.975.

The polyethylene/polyvinylbutyral coating solution is applied to the primer coated metal sheet with a roller coating machine in sufficient quantity to give a dried film weight of 1.0 to 2.0 milligrams per square inch metal surface and is dried at a temperature of at least 340° for 8 to 10 minutes. This temperature is sufficient to volatilize the solvent.

After cooling, the coated metal sheet is then blanked out and formed into caps with corrugated skirts by punch press operation. The polyethylene liners are then applied to the coated interior portion of the crown shell. The liners are formed from low density polyethylene and have a thickness between 0.004 and 0.035 inch. In one practice polyethylene in the shape of a disc having a diameter less than the internal diameter of the shell, is positioned in the center of the coated shell, the shell having been preheated to 120° to 150° C. A shaping punch or other suitable pressure means is engaged on the top of the disc to spread the polyethylene disc into the contour of the shell interior to form the liner while simultaneously forcing the liner into intimate contact with the coated interior of the shell to bond the liner to the metal shell which is thereafter allowed to cool.

To illustrate the practice of the present invention, the following example is given. It is to be understood, however, that the example is for the purpose of illustration, and the invention is not to be regarded as limited to any of the specific conditions or materials recited therein.

EXAMPLE 1

A tinplate sheet was primed on one side with the following primer composition:

| | Parts by wt. |
|---|---|
| VMCH | 77 |
| Varcum 1410 | 21 |
| ERL–2774 | 2 |
| Solvesso 150, an aromatic hydrocarbon solvent having a flash point of 145°–150° F. | 47.3 |
| Methylisobutyl ketone | 11.0 |
| Diacetone alcohol | 28.7 |

Sufficient of the primer composition was applied to deposit 4.4 milligrams per square inch of metal surface area. The primer was cured by baking for 10 minutes at 350° F.

The following adhesion promoting coating was applied to the primed surface:

| | Parts by wt. |
|---|---|
| High density polyethylene (0.97) | 8.5 |
| Shwanigan B–90, a polyvinylbutyral resin having a butyral content of 80% and a hydroxyl content of 18%–20% | 4.5 |
| Xylene | 47 |
| Methyl isobutyl ketone | 11 |
| Diacetone alcohol | 29 |

The above adhesion promoting coating was applied to the primed tinplate by means of a roller to deposit about 1.47 milligrams per square inch area.

The polyethylene/polyvinylbutyral coating composition had excellent coverage upon the primer coacted tinplate and was baked at 350° F. to form a solid film of the polyethylene/polyvinylbutyral composition on the primer coated metal surface.

The coated metal sheet was fed to a multiple head press where crown shells were punched and formed, the coated portion of the sheet forming the interior of the shell.

The coated shells were preheated to 120° F. and fed to an assembly machine where a circular disc of uniform weight (160 mgs.) cut from a rod of low density polyethylene (density 0.92, melt index 22) having a diameter less than the internal diameter of the shell, was placed in the center of the interior of each heated crown shell.

The crown liner was formed from the disc using a shaping plunger which shaped the polyethylene disc into the contour of the interior of the shell and simultaneously pressed the liner into engagement with the coated inner surface of the shell.

The lined shell was allowed to cool and upon examination, the polyethylene liner was found to be firmly bonded to the interior of the coated crown shell.

Comparative tests of the adhesiveness of the liner indicated that with a polyethylene liner formed in accordance with the above described procedure, the adhesion of the liner to the metal shell was greater than the cohesion of the liner so that the liner could not be removed from the shell without a tearing of the liner, whereas a polyethylene liner formed in a metal shell by a similar procedure which had been coated only with the polyethylene/polyvinylbutyral coating, the liner could be removed easily from the shell with a fingernail.

What is claimed is:

1. A method of making container closures of the type comprising a metal shell having a polyethylene liner which comprises the sequential steps of coating the interior of the shell with a primer coating composition comprised of a mixture of a vinylchloride copolymer, a thermosetting phenol-aldehyde resin, and an epoxy resin; curing the primer coating at an elevated temperature; applying over the primer coating an adhesion-promoting coating composition comprised of a mixture of polyethylene and a polyvinylbutyral resin; baking the adhesion-promoting coating composition at an elevated temperature; assemblying a liner formed from polyethylene in the shell in the coated shell; and then pressing the liner into intimate contact with the coated interior of the shell to bond the liner to the shell.

2. The method of claim 1 wherein the vinyl chloride copolymer is a copolymer of vinyl chloride, vinyl acetate, and maleic anhydride.

3. The method of claim 1 wherein the thermosetting phenol-aldehyde resin is a phenol-formaldehyde resin.

4. The method of claim 1 wherein the epoxy resin is the reaction product of p, p'-dihydroxy-diphenyl-dimethyl methane and epichlorhydrin.

5. The method of claim 1 wherein the primer coating contains about 65 to about 85 parts by weight of the vinyl chloride copolymer, about 15 to about 25 parts by weight of the phenol-aldehyde resin, and about 1 to about 3 parts by weight of the epoxy resin.

6. The method of claim 1 wherein the polyvinylbutyral resin has a butyral content of between about 77% and about 85% by weight calculated as polyvinylbutyral and content of free hydroxy groups between about 12% and about 21% by weight calculated as polyvinyl alcohol.

7. The method of claim 1 wherein the polyethylene in the adhesion-promoting composition is a high density polyethylene.

8. The method of claim 1 wherein the polyethylene and polyvinylbutyral are present in the adhesion coating composition at a ratio of about 2:1.

References Cited

UNITED STATES PATENTS

| | | | |
|---|---|---|---|
| 2,601,318 | 6/1952 | Navikas | 156—334 |
| 3,008,863 | 11/1961 | Morris et al. | 156—334 |
| 3,183,144 | 5/1965 | Caviglia | 156—334 X |
| 3,445,412 | 5/1969 | Gerhardt et al. | 156—334 X |

CARL D. QUARFORTH, Primary Examiner

S. J. LECHERT, Jr., Assistant Examiner

U.S. Cl. X.R.

117—75; 156—245; 161—218, 252, 254; 215—38, 39